Jan. 18, 1949.  W. W. HALLINAN  2,459,378
VARIABLE SPEED PULLEY
Filed June 10, 1946
Fig. 1
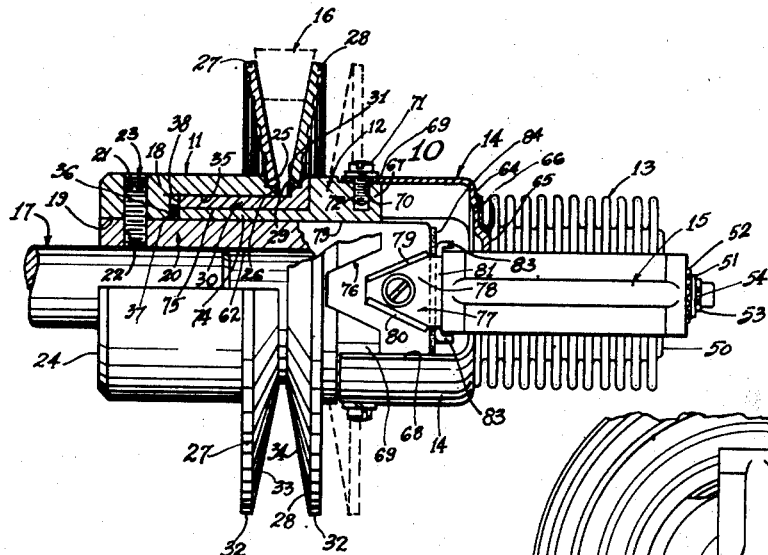
Fig. 2
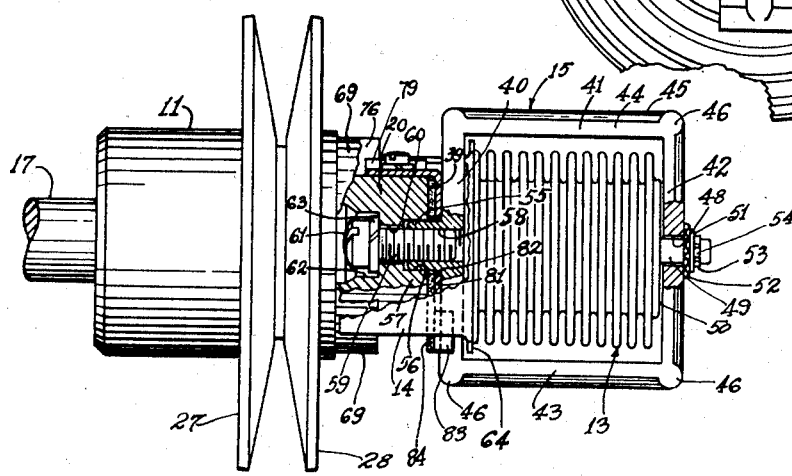
Fig. 3
Inventor,
William W. Hallinan
By: Robert H. Wendt,
Atty.

Patented Jan. 18, 1949

2,459,378

UNITED STATES PATENT OFFICE 2,459,378

VARIABLE-SPEED PULLEY

William W. Hallinan, Racine, Wis.

Application June 10, 1946, Serial No. 675,764

11 Claims. (Cl. 74—230.17)

The prevent invention relates to variable speed pulleys, and is particularly concerned with an improved commercial embodiment of the variable speed pulley covered by my prior Patent No. 2,308,655, issued January 19, 1943.

One of the objects of the present invention is the provision of an improved variable diameter pulley of the class described, which is adapted to be manufactured more economically than the devices of the prior art, which utilizes a minimum amount of labor and material and machining operations, and which is adapted to be used for a long period of time without the necessity for repair or replacement of its parts.

Another object of the invention is the provision of an improved thermostatically actuated and controlled variable diameter pulley which is dynamically balanced and which is adapted to have means for absorbing the vibrations, jolt or shock which is caused by the sudden transmission of forces by the pulley so that these shocks or jolts will not be transmitted to the thermostatic bellows.

Another object is the location of the sliding bearing in the center of the belt line so as to distribute evenly the load developed by the belt pull to both ends of the bearing and also to cover and protect the inner end of the bearing from dust and small particles of the belt as the belt wears.

Another object of the invention is the provision of an improved thermostatically controlled pulley having a minimum number of parts and adapted to vary its diameter and the speed of drive substantially proportionally to changes of temperature within a predetermined range.

Another object of the invention is the provision of an improved thermostatic pulley assembly, the elements of which are so arranged and constructed that they may be more economically manufactured, they are more durable, and they are easier to assemble, to maintain, and to service, than the devices of the prior art.

Another object of the invention is the provision of an improved structure, the parts of which are more easily maintained in a state of axial alignment and more easily placed in dynamic balance than the devices of the prior art, so that the present pulley structure is adapted to rotate more smoothly and to transmit force to its belt more uniformly than the devices of the prior art.

Other objects and advantages of the invention will be apparent from the following description and the accompanying drawings, in which similar characters of reference indicate similar parts throughout the several views.

Referring to the single sheet of drawings,

Fig. 1 is a top plan view of the improved pulley construction, partially broken away, on an axial plane, to show the interior structure, it being understood that either side might be called the top, and this view is arbitrarily selected as being one showing the shock absorbing device.

Fig. 2 is a side elevational view as compared to Fig. 1, with the interior structure partially broken away on an axial plane to show the mode of attachment of the frame and the bellows to the pulley sections.

Fig. 3 is an end elevational view taken from the right end of Fig. 2.

Referring to Figs. 1 and 2, 10 indicates, in its entirety, the thermostatically controlled pulley, the principal parts of which are the two pulley sections 27, 28, a thermostat 13, means for connecting one end of the thermostat to one pulley section, indicated at 14, and means for supporting and connecting the other end of the thermostat to the pulley section 11, indicated at 15.

The present variable diameter pulley is adapted to be used for a multiplicity of different purposes, some of which are illustrated by my prior patents, but, in general, it is used for engaging a belt of trapezoidal cross-section, usually called a V-belt, for the purpose of varying the speed of drive of a driven member by changing the effective diameter of the present pulley, that is, changing the diameter at which it engages the belt, such as a belt 16.

For this purpose the pulley may be mounted upon a shaft 17, and may be either the driving or the driven member; and it may be subjected to the ambient temperature of a room or other enclosure, or it may be subjected to temperatures induced by electric heating elements or hot air, or some other hot fluid, which is discharged on the thermostat 13 by a conduit in the manner shown in my above mentioned patent.

The present thermostatic pulley may increase its speed upon change of temperature, or it may decrease its speed upon change of temperature. In the example selected, the increase of temperature or expansion of the thermostat serves to force the pulley sections closer together, thus increasing its diameter against the action of the wedge-shaped belt, which, by virtue of its tension, tends to wedge the sections apart. Since the effective diameter of the pulley increases with increase of temperature, the same pulley may be used to increase a speed of drive when the pulley is the driving member, or it may be used to decrease the speed of drive when the pulley is the driven member.

The pulley section 11 may comprise a substantially cylindrical metal hub 18 which is formed with an axial bore 19 having a tight fit on a guide sleeve 20 of cylindrical shape. The guide sleeve 20 is further secured in the bore 19 by the fact that the hub 18 and guide sleeve 20 have registering threaded bores 21 and 22 for receiving a set screw 23 threaded into both bores and adapted to engage the shaft 17 to secure the pulley assembly on the shaft. Said screw 23 is preferably of the socket type, so that there will be no projecting parts.

Sleeve 20 and hub 18 preferably have plane end surfaces, indicated at 24, which are flush with each other at the left end. At its right end the hub 18 is preferably formed with an annular recess 25 of angular form, thus providing a reduced cylindrical portion 26 for receiving a pulley flange 27 which may have a pressed and shrunk frictional fit on the reduced cylindrical portion 26. The other pulley flange 28 is of like structure, oppositely disposed, and is located on a similar reduced cylindrical portion 29 of a supporting sleeve or hub 30. Both of these recesses may be of similar shape, and the pulley flanges 27 and 28 may be pressed home against an annular shoulder 31 in each case.

The two pulley flanges 27 and 28 may be identical in shape, and may consist of sheet steel members, of circular form, pressed to a substantially frusto-conical shape, and provided with the axially located apertures for receiving the reduced cylindrical portions 26 and 29 of hub 18 and sleeve 30. Thus each of the pulley flanges 27 and 28 has a circular edge 32, and each has a frusto-conical belt engaging face 33 or 34, the faces opposing each other.

The hub 18 is also preferably formed with a counterbore 35 surrounding the guide sleeve 20 and adapted to receive the hub portion of the pulley section 12 which is slidably mounted upon the guide sleeve 20 inside the counterbore 35. A bumper comprising a cork washer 36 rests against the annular end surface 37 of the counterbore 35 for engagement with the end 38 of hub 30.

In order to provide for the securement of pulley section 11 to the thermostat 13, the guide sleeve 20 is adapted to extend through the pulley section assembly 12, and is provided with a closed right end, Fig. 2, having a plane end surface 39 for engagement with the yoke or frame 15 which carries one end of the thermostat 13.

The yoke or frame 15 may consist of a substantially rectangular metal frame which may be a die casting or other form of casting or molded member, preferably of metal. The four sides of this frame are indicated by the numerals 40, 41, 42, 43. The three side members 41—43 of the frame may be identical in cross-sectional shape, each being formed of a flat body portion 44 with an integral reinforcing rib 45 projecting outwardly and located medially with respect to the edges of the section.

At the corners of the frame, it is preferably provided with cylindrical enlargements 46, thus increasing the cross-sectional area of the frame at these points, which might otherwise be too thin in cross-section to have the requisite strength.

The end side 42 of the frame 15 preferably has its rib 45 formed with a centrally located enlargement 47 having a through cylindrical bore 48 which is adapted to receive a cylindrical stem 49 carried by the thermostat 13 and supporting the thermostat at this end.

The supporting stem 49 may be made of brass soldered to the end plate 50 of the thermostatic bellows and axially located thereon, and is preferably provided with a flat washer 51 and a wavy spring washer 52 located inside a snap ring 53 which compresses the spring washer 52 and provides for a tight, rattle-proof connection of this end of the bellows to the frame.

The snap ring 53 comprises a partially circular ring of steel or other resilient metal, being of sufficient length peripherally of the stem 49 to permit it to be swung open at one side for removal from the stem 49 and to permit it to clamp itself on the stem 49 in a groove 54, as shown in Figs. 2 and 3. The snap ring 53 projects into the groove 54 sufficiently to secure it against axial movement on the stem 49, and it projects outwardly from the stem 49 in a radial direction sufficiently to engage the flat washer 51.

At its opposite end the frame 15 has its side member 40 provided with an axially extending cylindrical lug 55, and the lug 55 is of sufficient size to fit in a cylindrical bore 56 which is formed in the end wall 57 of the sleeve 20. The lug 55 itself has a threaded bore 58 for receiving a screw-bolt 59 which passes through a cylindrical bore 60 in the end wall 57 of sleeve 20, and which bolt has it head 61 located in the bore 62 of sleeve 20, which also receives the shaft 17.

A spring washer 63 is located between the head 61 and the end wall 57 of sleeve 20, so that the screw-bolt 59 will never become loose, due to vibration.

The thermostatic element 13 is preferably of the bellows type, one end plate 50 of which is to be fixedly secured to the frame 15, and the other end of the bellows is provided with an end plate 64 soldered to the end of the bellows like the end plate 50. In this case the end plate 64 preferably has a pressed depression 65 which fits inside the innermost fold of the bellows and an annular portion 66 which fits against the end flange of the bellows. This depression is provided with the usual filling tube, not shown, communicating with the interior of the bellows through the plate 66 and closed at its end by a drop of solder.

End plate 64 also is provided with a pair of partially cylindrical flanges 14 projecting in an axial direction and concentric with the axis of the pulley and fitting on the hub member 67 of the pulley section 12. Each of the partially cylindrical flanges 14 may extend over substantially one quarter of the periphery, being spaced by a slot 68 on each side which provides space for the frame 15.

The hub 67 of pulley section 12 comprises a substantially cylindrical metal member which also forms a bearing for slidably mounting this pulley section on the guide sleeve 20. Therefore, hub 67 is preferably constructed of a different metal, such as bronze, brass, or a bearing metal, while the hub 18 and sleeve 20 are preferably constructed of steel, which is also used for constructing the pulley flanges 27, 28.

Hub 67 may have a cylindrical portion 68 substantially as large as the hub 18, which is provided with a reduced cylindrical portion 69 on which the cylindrical flanges 14 fit. Each cylindrical flange may be provided with an aperture 70 for passing a screw-bolt 71 which is preferably provided with a spring lock washer and is threaded into a threaded bore 72 in the hub 67.

Thus the flanges 14 are fixedly mounted on the pulley section 12 so that the left end of the bellows 13 moves with pulley section 12, while the right end of the bellows is fixedly secured to the frame 15, which is, in turn, fixedly secured by the bolt 59 to sleeve 20 which carries the pulley section 11. As the hub 12 forms a bearing, it has a cylindrical bore 73 which is adapted to have a close sliding fit on the outer cylindrical surface of guide sleeve 20.

The bearing portion 74 of hub 12 is a tubular portion of considerable length, so that the pulley flanges may be guided for axial sliding movement without binding. Bearing portion 74 is housed in a cylindrical bore 75 in the sleeve 30 which carries the pulley flange 28, to which sleeve 30 the bearing 70 is secured by a tight frictional fit.

Hub 67 preferably has a wedge-shaped slot 76 extending axially into its right edge. This slot is of substantially complementary shape to a wedge member 77, which has a trapezoidal body 78 and a pair of upturned flanges 79 and 80 defining the surfaces of a wedge and adapted to engage in the wedge-shaped slot 76.

Body 78 of this wedge is provided with an attaching flange 81, the edge of which is seen in Fig. 2, and the attaching flange may be a substantially rectangular strip of metal extending across the end of sleeve 20 and engaging the side 40 of the frame 15.

Attaching flange 81 has an aperture 82 for passing the lug 55 which is carried by frame 15, and the attaching flange 81 also extends on the side opposite to the wedge 77 to a radial distance within the diameter of hub 67 and is provided with laterally turned flanges 83, 83 engaging on each side of the end frame member 40 of the frame 15.

Thus the frame 15, although secured by a single screw-bolt 59, is secured against rotation by the wedge member 77 having flanges 83, 83 on opposite sides of frame 15. A bumper 84 is provided comprising a sheet of cork of a shape fitting on the end of the sleeve 20 and also extending radially beyond the sleeve, on the left side of the attaching flange 81 of the wedge 77, so as to engage the end 39 of the hub 67.

Thus there is a cork bumper 84 limiting the spreading movement of the pulley flanges and another cork bumper 36 limiting the movement of the pulley flanges toward each other. These reduce shocks on the thermostat and also reduce noise when a load is suddenly applied or taken off the belt of the pulley.

In some embodiments of the invention the pulley section 12 may be keyed by means of an ordinary slot and key for sliding movement on the pulley section 11, relative rotative movement being positively prevented.

According to the present invention, the wedge 77 and the wedge-shaped slot 76 act in the nature of a key for preventing relative rotation between the pulley flanges or sections beyond a predetermined amount, and for also absorbing shock which is applied to the movable pulley section 12 by the bolt.

The inclination of the contacting surfaces of the wedge-shaped groove 76 with the flanges 79 and 80 of the wedge 77 causes an inward wedging action of the movable section 12 toward the fixed section 11 due to the rotation of the driving force on the pulley flange 28. This prevents any vibrations, jolt or jar which may be impressed upon the belt from being transmitted to the thermostatic bellows. By reason of the inclination of these contacting surfaces 76 and 79 and 80, any jar from the belt will be absorbed in slippage between these contacting surfaces, and this will be true regardless of the direction in which the belt is being driven.

The operation of my thermostatic pulley will be apparent from the description of its various parts. The bellows which constitutes the container for the thermostatically responsive element, such as the gas, is preferably filled with a limited amount of volatile liquid of suitable characteristics, so that it is changed from liquid to gas at a suitable temperature to effect the expansion of the thermostatic element 13. The amount of this liquid is limited, so that expansion takes place as it becomes vaporized, and when it has all changed to gas, further expansion of the gas takes place only responsive to the superheating of the gas.

This gives the thermostat a proportional increase in pressure and expansive power while the liquid responsive element is being depressed, which responsive action continues until all of the liquid is vaporized, whereupon the curve of pressure flattens out so that further increase of pressure by superheating is substantially reduced over that which was being accomplished while the gas was being vaporized. Thus the thermostat may act between predetermined temperature limits by choosing a proper responsive element for filling the bellows 13.

Furthermore, there is little or no danger that the bellows will be ruptured by overheating. Suitable chemical compositions which may be used for filling the bellows are ethyl chloride, methyl chloride, alcohol, and ethyl ether, for predetermined temperature ranges.

In the preferred embodiment of the present invention I prefer to use freon gas (F-11) on the air conditioning blower installations which operate at a normal bonnet temperature of from 100 to 150 degrees Fahrenheit. This temperature range might be changed, depending upon the furnace design, and in such case one of the other refrigerants mentioned would be used.

When the bellows and its volatile content are cool, the bellows will be contracted to a minimum size, and the pulley flanges may be spread apart to their maximum distance, as indicated in dotted lines in Fig. 1. The bellows themselves are resilient and may tend to push the pulley flanges together, but the action of the belt on the frustoconical faces 33, 34 of the pulley flanges will tend to wedge them apart, overcoming the resilient tendency of the bellows to expand.

When the pulley sections are farther apart, the wedge-shaped belt 16 will ride downwardly in the pulley groove and engage the faces 33 and 34 of the pulley flanges at a radius which is closer to the axis than the position shown in Fig. 1. Then the pulley is at its minimum effective diameter. As the temperature of the bellows and its content increases, the pressure generated in the bellows causes it to expand.

The bellows reacts at the right end on the frame 15 which is carried by the fixed section 11 of the pulley by the frame 15 being secured to the sleeve 20 by bolt 59. The free end, or left end, of the bellows pushes on the cylindrical securing flanges 14, which are secured to the hub 67 of the movable pulley section 12, tending to push the two pulley sections together.

The amount of pressure, and the movement of the pulley sections, are proportional to the temperature within the predetermined range of temperature for which the device is constructed. In the same way, the effective diameter of the pulley, that is, the radius at which the belt 16 engages the pulley flanges, is proportional to the temperature of the bellows.

Another important feature is the elongated bearing of the member 30 on the bearing 74, which is housed in the bore 35. This housing protects the end of the sliding bearing from the ravelings and particles of the belt as it wears out; and as the bearing projects beyond the belt center on each side, the load from the belt is centered on the bearing, especially when there is a heavy pull driving the flanges apart.

By virtue of the fixed securement of the lower end of the bellows by means of cylindrical flanges 14 on the hub 67, this end of the bellows must have a substantially straight-line motion in an axial direction, and this structure thus tends to keep all of the parts of the bellows and pulley concentric with respect to the axis of the pulley.

The device is substantially symmetrical in all directions, extending from the axis, and is therefore dynamically balanced, and the screws and other securing devices or symmetrically located. The extension of the wedge member 11 past the axis and toward the other side of that diameter also tends to effect a dynamic balance of the weight of this small element of the assembly.

It will thus be observed that I have invented an improved commercial embodiment of the invention, which has a minimum number of parts, and the parts of which require a minimum amount of labor, such as machining. The pulley flanges being stamped out of sheet metal and pressed upon hubs, greatly reduces the cost of making the pulley sections.

The present device operates noiselessly, and is so constructed that jars and jolts are kept from being transmitted to the thermostat. It is adapted to be used in numerous applications where the speed of blowers, stokers, fans, and other driven members is to be regulated in accordance with changes of temperature.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a thermostatically controlled pulley, the combination of a pair of pulley sections movably mounted for axial movement relative to each other with a thermostat adapted to react against one section and to act on the other section to move the sections toward each other or apart in accordance with changes of temperature, the said thermostat comprising a bellows having one end secured to a frame member carried by one pulley section, the opposite end of the bellows having an end plate provided with a pair of axially extending flanges which are fixedly secured to the other pulley section.

2. In a thermostatically controlled pulley, the combination of a pair of pulley sections movably mounted for axial movement relative to each other with a thermostat adapted to react against one section and to act on the other section to move the sections toward each other or apart in accordance with changes of temperature, attaching flanges carried by said thermostat, the said latter flanges being partially cylindrical and engaging a complementary part on said other pulley section, whereby that end of the bellows is guided for axial movement and maintained in a state of dynamic balance at all times.

3. In a thermostatically controlled pulley, the combination of a pair of pulley sections movably mounted for axial movement relative to each other with a thermostat adapted to react against one section and to act on the other section to move the sections toward each other or apart in accordance with changes of temperature, the said thermostat comprising a bellows having one end secured to a frame member carried by one pulley section, the opposite end of the bellows having an end plate provided with a pair of axially extending flanges which are fixedly secured to the other pulley section, the end of the bellows reacting on the first mentioned pulley section being fixedly secured in a frame, and said frame surrounding said bellows and being secured by an axial securing device to said first mentioned section.

4. In a thermostatically controlled variable diameter V-pulley, the combination of a fixed pulley section comprising a hub provided with a flange forming one side of the V-pulley, the said hub being mounted on a cylindrical guide member adapted to be secured to a shaft, a second pulley section comprising a hub, the said latter hub forming part of a bearing slidably mounted on said guide member, the said bearing having a sleeve slidably mounted in a counterbore in the hub of the first section, and said latter sleeve supporting a second pulley flange provided with the opposite face of the V-pulley groove, and thermostatic means for acting on one section and reacting on the other section to control the spacing between said faces of the pulley groove, said thermostat being mounted within a frame and said frame being fixedly secured to the end of said guide member by a centrally located securing means.

5. In a thermostatically controlled variable diameter V-pulley, the combination of a fixed pulley section comprising a hub provided with a flange forming one side of the V-pulley, the said hub being mounted on a cylindrical guide member adapted to be secured to a shaft, a second pulley section comprising a hub, the said latter hub forming part of a bearing slidably mounted on said guide member, the said bearing having a sleeve slidably mounted in a counterbore in the hub of the first section, and said latter sleeve supporting a second pulley flange provided with the opposite face of the V-pulley groove, and thermostatic means for acting on one section and reacting on the other section to control the spacing between said faces of the pulley groove, said thermostat being mounted within a frame and said frame being fixedly secured to the end of said guide member by a centrally located securing means comprising a screw-bolt located in a bore in said guide member and passing through an end wall of said guide member into said frame.

6. In a thermostatically controlled variable diameter V-pulley, the combination of a fixed pulley section comprising a hub provided with a flange forming one side of the V-pulley, the said hub being mounted on a cylindrical guide member adapted to be secured to a shaft, a second pulley section comprising a hub, the said latter hub forming part of a bearing slidably mounted on said guide member, the said bearing having a sleeve slidably mounted in a counterbore in the hub of the first section, and said latter sleeve supporting a second pulley flange provided with the opposite face of the V-pulley groove, and thermostatic means for acting on one section and reacting on the other section to control the spacing between said faces of the pulley groove, said thermostat being mounted within a frame and said frame being fixedly secured to the end of said guide member by a centrally located securing means comprising a screw-bolt located in a bore in said guide member and passing through an end wall of said guide member into said frame, said frame also having an axially projecting lug with a threaded bore for receiving said bolt, and said lug being located in a counterbore in said end wall to assure the concentric location of said frame.

7. In a thermostatically controlled variable diameter V-pulley, the combination of a fixed pulley section comprising a hub provided with a flange forming one side of the V-pulley, the said hub being mounted on a cylindrical guide member adapted to be secured to a shaft, a second pulley section comprising a hub, the said latter hub forming part of a bearing slidably mounted on said guide member, the said bearing having a sleeve slidably mounted in a counterbore in the hub of the first section, and said latter sleeve supporting a second pulley flange provided with the opposite face of the V-pulley groove, and thermostatic means for acting on one section and reacting on the other section to control the spacing between said faces of the pulley groove, said thermostat comprising a bellows fixed at one end on one of said pulley sections and having at its opposite and free end a pair of longitudinally extending rigid flanges fixedly secured to the other pulley section, whereby the free end of the bellows is maintained in concentric and dynamic balance.

8. In a thermostatically controlled pulley, the combination of a substantially rectangular metal frame, said frame being provided on one of its sides with an axially extending bore and a bellows thermostat having a stem adapted to be received in said bore, said frame being secured to one of a pair of movable V-pulley sections and the other end of said bellows being secured to the other of the movable pulley sections, said thermostat being provided at its free end with a pair of partially cylindrical flanges engaging and secured to a complementary cylindrical part on the pulley section on which this end of the thermostat acts.

9. In a variable diameter pulley, the combination of a guide sleeve having a cylindrical bore and an external cylindrical guide surface, with a fixed hub member comprising a substantially cylindrical elongated metal member having a bore for receiving said guide member and having an elongated counterbore surrounding said guide member, said hub having a threaded axial bore registering with a similar bore in said guide member, a common threaded member threaded into said latter bores for securing said pulley to a shaft, a bearing sleeve comprising a metal member having a bore for receiving said guide member and having an external cylindrical surface, said sleeve extending into but occupying only a part of said counterbore, and having an enlarged cylindrical body portion, a movable hub member comprising a metal sleeve having a cylindrical bore adapted to receive said bearing sleeve, and having an external cylindrical surface having a sliding fit in said counterbore, and a pair of opposed frusto-conical belt engaging flanges, one carried by each of said hubs, said flanges being centrally located on the assembly whereby binding is eliminated and the sliding surfaces are enclosed, said guide member carrying a thermostat supporting frame, a thermostate in said frame and reacting against the frame, and a pair of substantially rigid cylindrical flanges secured at one end to the thermostat, and at their other ends to said enlarged portion of said bearing sleeve, whereby the thermostat may act on the bearing sleeve which engages and acts on the movable hub, to urge the belt engaging flanges together.

10. In a variable diameter pulley, the combination of a guide sleeve having a cylindrical bore and an external cylindrical guide surface, with a fixed hub member comprising a substantially cylindrical elongated metal member having a bore for receiving said guide member and having an elongated counterbore surrounding said guide member, said hub having a threaded axial bore registering with a similar bore in said guide member, a common threaded member threaded into said latter bores for securing said pulley to a shaft, a bearing sleeve comprising a metal member having a bore for receiving said guide member and having an external cylindrical surface, said sleeve extending into but occupying only part of said counterbore, and having an enlarged cylindrical body portion, a movable hub member comprising a metal sleeve having a cylindrical bore adapted to receive said bearing sleeve, and having an external cylindrical surface having a sliding fit in said counterbore, and a pair of opposed frusto-conical belt engaging flanges, one carried by each of said hubs, said flanges being centrally located on the assembly whereby binding is eliminated and the sliding surfaces are enclosed, the said guide member carrying an axially extending frame, and a thermostat located in said frame, and having an axially extending supporting stud located in a bore in the end of said frame, said stud having a groove outside said frame, and a spring retaining member partly in said groove and projecting from said groove to engage the end of said frame to retain said thermostat, the latter having its other end secured to said sleeve enlargement.

11. In a variable diameter pulley, the combination of a guide sleeve having a cylindrical bore and an external cylindrical guide surface, with a fixed hub member comprising a substantially cylindrical elongated metal member having a bore for receiving said guide member and having an elongated counterbore surrounding said guide member, said hub having a threaded axial bore registering with a similar bore in said guide member, a common threaded member threaded into said latter bores for securing said pulley to a shaft, a bearing sleeve comprising a metal member having a bore for receiving said guide member and having an external cylindrical surface, said sleeve extending into but occupying only part of said counterbore, and having an enlarged cylindrical body portion, a movable hub member comprising a metal sleeve having a cylindrical bore adapted to receive said bearing sleeve, and having an external cylindrical surface having a sliding fit in said counterbore, and a pair of opposed frusto-conical belt engaging flanges, one carried by each of said hubs, said flanges being centrally located on the assembly whereby binding is eliminated and the sliding surfaces are enclosed, said guide member carrying a thermostat frame, said frame having a tubular axial extension located in a bore in said guide member, said tubular extension having a threaded bore, and a threaded member in said bore for securing said frame to said guide member, said threaded member having its head located in a counterbore in said guide member, and having a shank passing through a bore in the end of said guide member.

WILLIAM W. HALLINAN.

REFERENCES CITED

The following references are of record in the file of this patent:

UNITED STATES PATENTS

| Number | Name | Date |
|---|---|---|
| 1,299,691 | Devy | Apr. 8, 1919 |
| 1,629,174 | Patton | May 17, 1927 |
| 1,795,570 | Nilson | Mar. 10, 1931 |
| 1,931,663 | Larson | Oct. 24, 1933 |
| 2,210,976 | Hallinan | Aug. 13, 1940 |
| 2,247,552 | Heyer | July 1, 1941 |
| 2,308,655 | Hallinan | Jan. 19, 1943 |

FOREIGN PATENTS

| Number | Country | Date |
|---|---|---|
| 21,198 | Great Britain | Sept. 25, 1906 |